United States Patent [19]

Zboril

[11] 4,147,466

[45] Apr. 3, 1979

[54] ARRANGEMENT FOR MAINTAINING OPTIMUM MINIMUM OPERATING CLEARANCE BETWEEN ROTOR AND STATOR COMPONENTS OF FLUID-FLOW MACHINES AND THE LIKE

[75] Inventor: Josef Zboril, Fislisbach, Switzerland

[73] Assignee: BBC Brown, Boveri & Company Limited, Switzerland

[21] Appl. No.: 831,641

[22] Filed: Sep. 8, 1977

Related U.S. Application Data

[63] Continuation of Ser. No. 700,449, Jun. 28, 1976, Pat. No. 4,083,650, which is a continuation of Ser. No. 483,076, Jun. 25, 1974, abandoned.

[30] Foreign Application Priority Data

Jun. 29, 1973 [CH] Switzerland .................... 5487/73

[51] Int. Cl.² ............................................. F01D 11/08
[52] U.S. Cl. ..................................... 415/174; 415/200
[58] Field of Search ............... 415/134, 136, 174, 200, 415/212 R, 196, DIG. 5

[56] References Cited

U.S. PATENT DOCUMENTS

| 2,930,521 | 3/1960 | Koehning | 415/174 |
| 3,701,536 | 10/1972 | Matthews et al. | 415/172 A |

*Primary Examiner*—Louis I. Casaregola
*Attorney, Agent, or Firm*—Werner W. Kleeman

[57] ABSTRACT

Between the rotor and stator components of turbomachines, compressors, pressure wave machines and the like, the clearance space is partially filled out by an abradable element which is capable of "growing" when subjected to an elevated temperature and/or to the influence of the particular atmosphere in which the machine operates. As the element grows, it compensates for corrosion and erosion factors which take place in the machine and which otherwise tend to increase the clearance. Suitable materials which will "grow" under these operating conditions are gray cast iron and a sintered graphite-metal.

2 Claims, 5 Drawing Figures

ARRANGEMENT FOR MAINTAINING OPTIMUM MINIMUM OPERATING CLEARANCE BETWEEN ROTOR AND STATOR COMPONENTS OF FLUID-FLOW MACHINES AND THE LIKE

CROSS-REFERENCE TO RELATED CASE

This application is a continuation application of my commonly assigned United States application Ser. No. 700,449, filed June 28, 1976, now U.S. Pat. No. 4,083,650, granted Apr. 11, 1978 which, in turn, is a continuation application of my commonly assigned, co-pending United States Application Ser. No. 483,076, filed June 25, 1974, now abandoned, and entitled "Arrangement for Maintaining Optimum Minimum Operating Clearance Between Rotor And Stator Components of Turbo-Machines, Compressors, Pressure Wave Machines and The Like".

BACKGROUND OF THE INVENTION

The present invention relates to an improved technique by means of which the necessary operating clearance between the rotor of a machine and its associated stator component can be maintained at a safe minimum thereby to maintain an optimum efficiency of operation during the life of the machine.

The invention is applicable to various types of machines incorporating rotor and stator components such as for example various types of turbines, compressors and pressure wave machines, an example of the latter being disclosed in U.S. Pat. No. 3,591,313, granted July 6, 1971 to Alfred Wunsch.

The efficiency of such manchines is determined by various factors including the size of the operating clearance between the rotor and stator and will decrease as the clearance increases. For this reason, efforts are being continuously made to reduce the clearance as much as possible without, however, incurring potential damage to the machinery as would be caused by accidental touching of the stator by the rotor. The optimum amount of the necessary operating clearance is determined on the basis of the properties of the materials involved, manufacturing technology, the size of the rotor and stator and also the operating conditions of the machine. Care must also be taken that in exceptional circumstances, whenever the rotor touches the stator, that damage will not occur. Such exceptional circumstances may arise, for example, during the starting-up period of the machine, or in the event of strong vibrations occuring during operation, or excessive increases in machine temperature and the like.

It has been proposed, for example, in the case of turbo-machines and compressors, to provide the tips of the rotor blading with a bevelled surface in order to keep the operating clearance between the blading and the surrounding surface of the stator to a minimum. In the event that the tips of the blades touch the stator surface, the bevelled blade will deform, or wear down, and no harmful forces will be generated.

It has also been proposed, in order to establish a minimum clearance, to coat the walls of the stator at their inner surface opposite the rotor with a relatively soft layer which can be abraded away or deformed by any accidental touching of the tips of the rotor blading. Such soft layers can consist, for example, of graphite, die-cast or sintered porous nickel-chromium alloys, or nickel-graphite materials, honeycombed cells, etc. and are called abrasable layers for touch protection. All protective layers of this type are lacking in the property to "grow" i.e., to increase in size, under the influence of the environmental temperature and/or the particular atmosphere in which the machine operates.

These know expedients have the disadvantage that the bevelled blade ends or soft layers will change their shape irreversibly upon contact, either by deforming or wearing down. In addition thereto, the blade ends, in the case of turbo-machines and compressors, or the ends of the cell walls, in the case of pressure wave machines, as well as the stator will be subjected to corrosion and erosion, with the result that the operating clearance as between rotor and stator will increase continuously and the efficiency of the machine will decrease in a corresponding manner.

SUMMARY OF THE INVENTION

The principal object of the present invention is to maintain the operating clearance between the rotor and stator at a safe minimum even in the case of operations lasting for long periods of time.

This objective is attained in that within the region of the clearance, there is utilized an abrasive or abradable material that will "grow", i.e., increase in size and which is brought about by the operating temperature and/or working atmosphere of the machine.

BRIEF DESCRIPTION OF THE DRAWINGS

The inventive concepts will be further explained in further detail as applied to different types of machines and as illustrated in the accompanying drawings wherein.

DETAILED DESCRIPTION OF THE INVENTION

Figure 1:
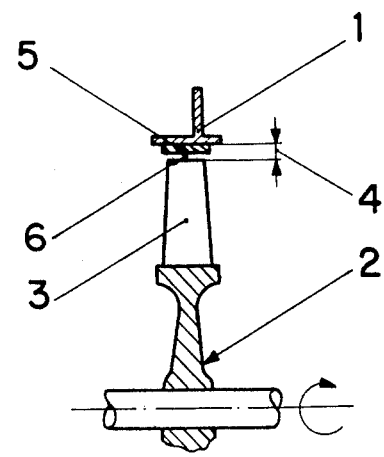
FIG. 1 is a sectional view showing a portion of the rotor and stator of a compressor as improved by the invention.

With reference now to FIG. 1, which shows a section of an axial cut through a compressor, there is provided the stator component 1, the rotor 2 and the rotor blading 3. The stator and rotor are made of a volume-stable material, for example, steel. In order to maintain the distance 4 between the ends of the rotor blading 3 and the stator 1 as small as possible, there is secured at the internal surface of the stator 1 opposite the blade ends a segmented ring 5 and which is made from one of the abradable materials heretofore referred to as being capable of "growing", preferably gray cast iron. In the event that the tips of the blades 3 touch the segmental ring 5, they will become deformed if they are bevelled, or the segmented ring 5, if soft will become eroded on the rotor side. Due to, for example, the oxidizing atmosphere in which the compressor works on the one hand, and the operating temperature of the compressor on the other hand, or both, the ring 5 will irreversibly "grow"

in the radial direction towards the rotor axis thus reducing the clearance 6 that has been accidently caused to increase by the unforeseen touching and corrosion-erosion effect heretofore referred to. In this manner, there is compensated out the corrosion- and erosion-degradation, as well as the wear caused by unforeseen vibrations and temperature increases. Thus the segmental ring 5 by its growth serves as a self-compensating member to maintain the operating clearance at an optimum minimum thereby achieving a continuous optimum efficiency over a long period of operating time of the machine.

Figure 2:
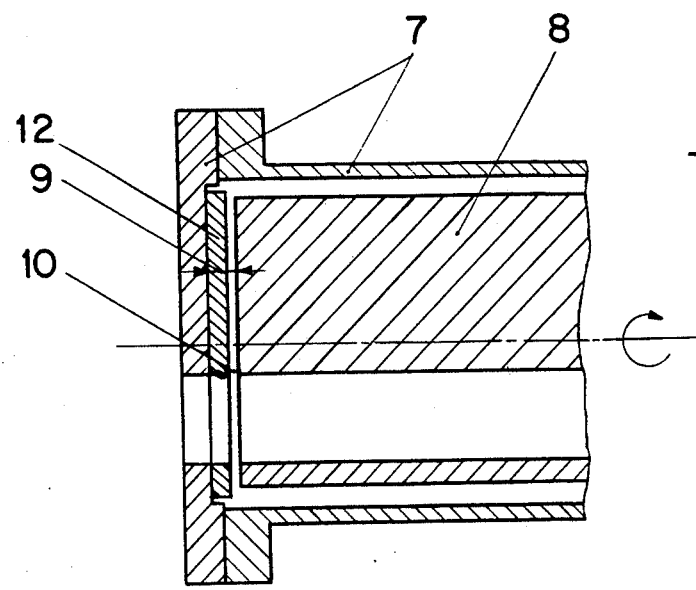
FIG. 2 is a sectional view of a portion of the rotor and stator of a pressure wave machine.

In FIG. 2, the teachings of the invention have been illustrated as applied to a pressure wave machine of the general type more completely disclosed, for example, in the above-referred to U.S. Pat. No. 3,591,313. The stator component 7 of the machine is made from cast iron with spheroidal graphite and its rotor 8 is made from a nickel alloy. In order to maintain the distance 9 between the front end of the celled rotor 8 and the stator 7 as small as possible a plate 12 is cast into the stator 7 so as to face the end of the rotor. Plate 12 is made from an abradable material capable of growth, preferably soft gray iron. Thus, here again, the plate 12 will "grow", i.e., increase its volume in the axial direction towards the end of rotor 8 as a result of an oxidizing working atmosphere handled by the machine, on the one hand and/or by the operating temperature of the machine, on the other hand. Thus, the clearance 10 will be maintained at an optimum minimum value.

The embodiment illustrated in FIG. 2 can be modified by securing plate 12 to the front end of rotor 8 rather than to the stator so that plate 12 will "grow" in the direction of the rotor axis towards stator 7, thereby achieving the same result. In principle, it is thus feasible to affix such a self-compensating growth of growable component to the rotor and/or the stator. Since the rotor parts are usually subjected to heavy mechanical stresses it will be expedient to provide only the stator component with the necessary growable element.

If, in the embodiments illustrated in FIGS. 1 and 2, no unexpected circumstances arise and no wear occurs, so that the growth of the segmented ring 5, or of plate 12, respectively will become greater than the abrasive wear-down effect caused by corrosion and erosion, the parts will be worn down gradually by the rotor, with the result that the clearance 6, as in FIG. 1, or clearance 10 as in FIG. 2, will always be maintained at a minimum.

Figure 4:
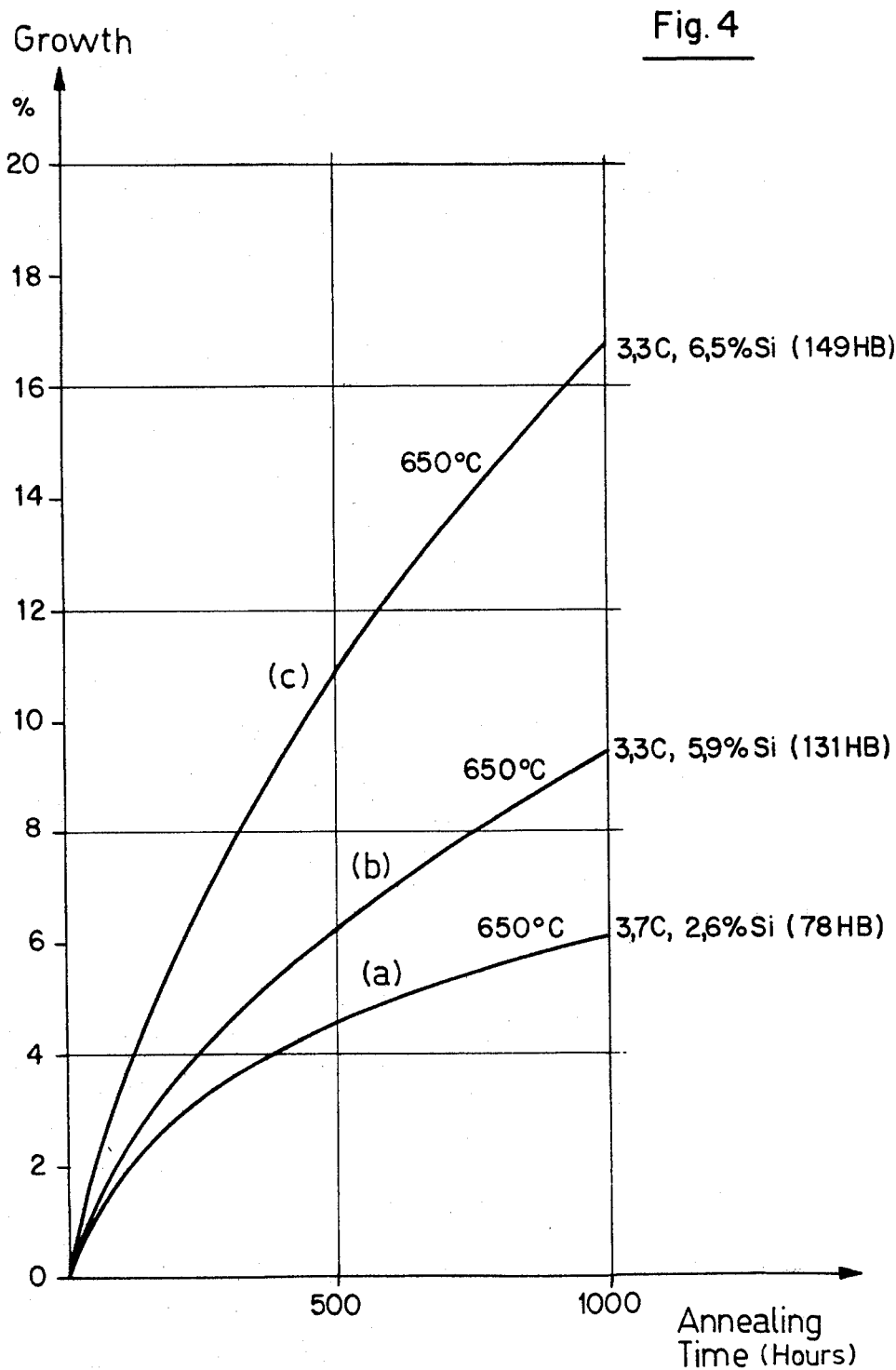
FIG. 4 are also graphs plotting the "growth" of three different types of abradable gray iron alloys that can be used in establishing the clearance region.

The growth characteristics of three different types of gray cast iron are plotted in FIG. 4, in relation to annealing time in hours at an air temperature of 650° C. Plot "a" is for a gray cast iron containing 3.7% carbon, 2.6% silicon, (78HB). Plot "b" is for a gray cast iron containing 3.3% carbon, 5.9% silicon, (131HB). Plot "c" is for a gray cast iron containing 3.3% carbon, 6.5% silicon, (149HB).

The "growth" characteristic of the gray cast iron which is utilized for the manufacture of the segmented ring 5 or plate 12, can be varied widely, for example, by proper selection of its components, by variation of the cooling speed during casting of the iron, by thermal treatment of the iron after casting, and so forth.

Furthermore, the growth of the segmented ring 5 or plate 12 produced from the gray cast iron is influenced by its shape, the type of fastening to the base material, by its stress, and by the operating temperature and type of atmosphere in which the machine operates.

It is also possible to use for the manufacture of the segmented ring 5 and plate 12 abradable cast iron types other than gray cast iron, such as malleable cast iron, cast iron with graphite, partially, in globular and partially in lamellar form, and so forth, dependent upon the characteristics desired for the growable element.

The growable elements are secured to the supporting base material of the stator or of the rotor by standard methods, mechanically, or by soldering, welding, casting, sintering and so forth.

Figure 3:
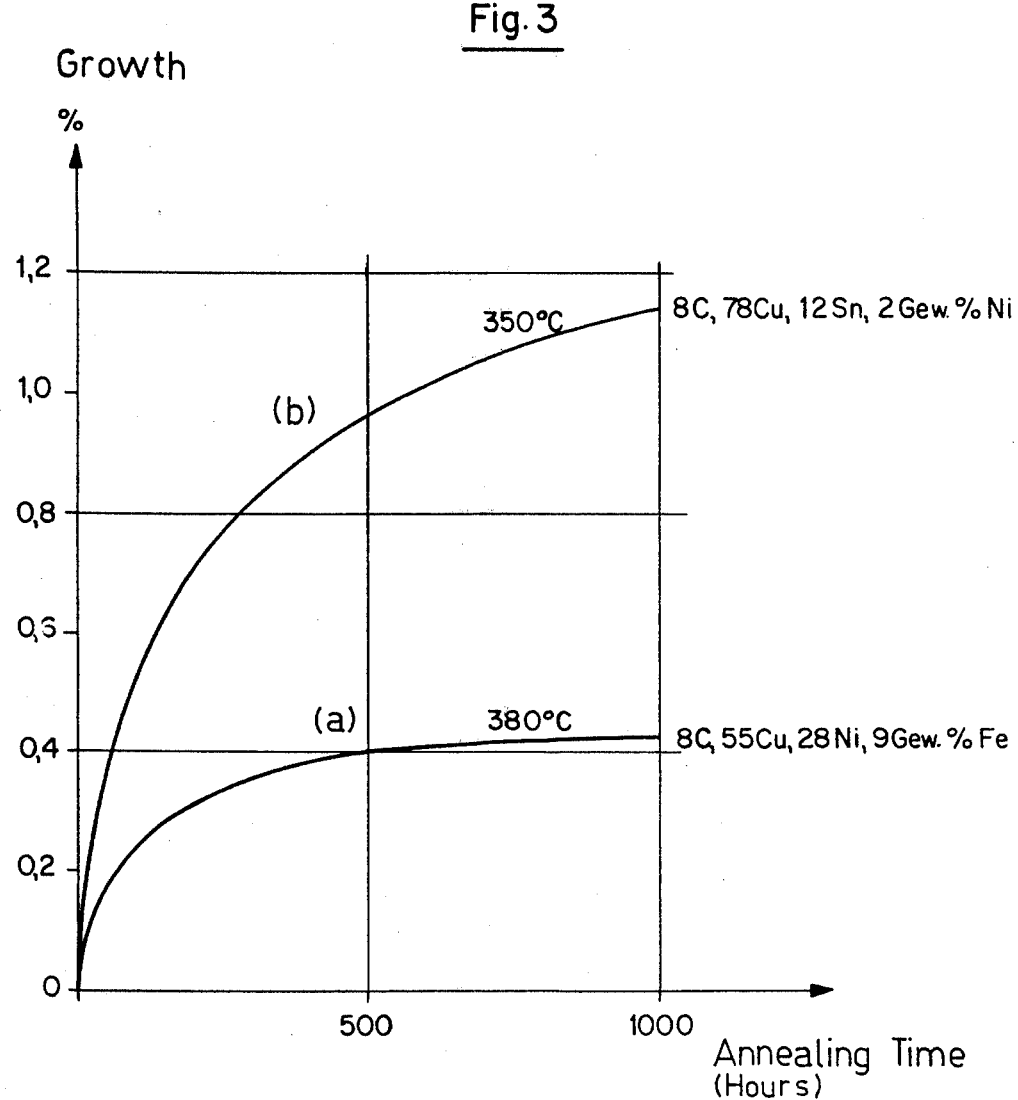
FIG. 3 are graphs plotting the "growth" characteristic of two different abradable sintered graphite-metal alloys that can be used in establishing the region of clearance as between rotor and stator components of a machine.

The growable elements also can be made from abradable materials other than cast iron, i.e., materials which will grow by oxidation at higher temperatures. Particularly suitable are sintered graphite-metal-materials, their metal phase containing nickel, copper, iron, tin, lead, antimony and/or zinc. The two different graphs plotted in FIG. 3 in which growth is plotted in relation to annealing time in hours in air at a temperature of 350° C. show that the growth will be faster if the metal phase contains a greater amount of readily oxidizable components such as copper and tin. Plot "a" is for a sintered material containing, by weight, 8% carbon, 55% copper, 28% nickel and 9% iron. Plot "b" is for a sintered material containing, by weight, 8% carbon, 78% copper, 12% tin and 2% nickel.

In principle, it is possible to use for the manufacture of the elements 5 and 12 any abradable material that will "grow" under the influence of chemical elements, or in combination with the environment, for example, by carburization, nitriding, sulphurating, oxidation and the like, or by a change in structure under the influence of the operating temperature.

If it is desired to keep the forces generated by touching of the rotor and stator parts to a very low value, it is possible, in the case of the two different embodiments of the invention which have been described herein, to apply to the rotor side of the growable element 5 or 12 respectively, an additional, known soft protective layer as previously described which will abrade off with ease.

Figure 5:
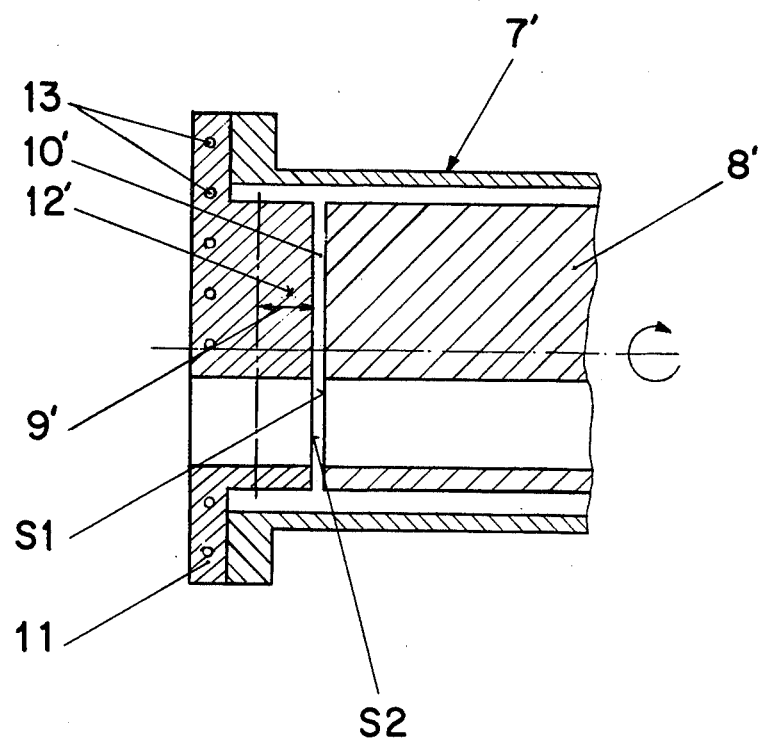
FIG. 5 is a sectional view of a portion of the rotor and stator components of another pressure wave machine.

The embodiment of the invention as illustrated in FIG. 5 is similar to that of FIG. 2, namely a pressure wave machine and hence the same numerals have been used to designate those parts which are common to both. The construction according to FIG. 5 differs from that of FIG. 2 in that the front end cover plate 11 of the stator 7' and plate 12' have been integrated into a single structure and which is made from a material, preferably gray cast iron, which will grow under the influence of the particular atmosphere or temperature at which the pressure wave machine operates. A "separation" as between the cover plate portion 11 and plate 12' is shown symbolically by a dash-dot line. Any growth of the cover plate portion can be prevented, for example, by locating cooling coils 13 within this portion, thus assuring a continuous low operating temperature thereof. Here again, it is possible to place on one, or both of the front sides S2,S1 of the plate portion 12' and the end of the rotor 8', respectively, protective layers, as described, which will abrade off with ease.

While there are shown and described present preferred embodiments of the invention, it is to be distinctly understood that the invention is not limited hereto, buy may be otherwise variously embodied and practiced within the scope of the following claims. ACCORDINGLY,

What I claim is:

1. In a machine operating under varying operating conditions and which incorporates rotor and stator components and wherein a space is provided intermediate a surface of the rotor and an oppositely located surface of the stator thereby to define an operating clearance therebetween for the rotor, the improvement comprising an abradable element interposed in said space and partially filling the same, said abradable element constituting a growth element compensating for its own growth or wear in order to maintain said operating clearance at a size promoting efficient operation of the machine throughout its varying operating conditions, and said growth element growing irreversibly under the operational conditions of the machine to thereby compensate for repeated abrasion or wear to which said growth element is subjected to during operation of the machine throughout its verying operating conditions.

2. In a machine which incorporates rotor and stator components and wherein at least one abradable sealing element is provided intermediate a surface of the rotor and an oppositely located surface of the stator thereby to define an operating clearance therebetween, the improvement that said abradable element consists of a sintered graphite-metal composition and that the metal phase of said composition contains at least one element of the group consisting of copper, tin, lead, antimony and zinc together with at least one element of the group consisting of nickel and iron, said abradable element constituting a growth element compensating for its own abrasion or wear in order to maintain said operating clearance at a size promoting efficient operation of the machine and said growth element growing under the operational conditions of the machine to thereby compensate for abrasion or wear to which said growth element is subjected to during operation of the machine.

* * * * *